United States Patent [19]
Sato et al.

[11] 4,200,380
[45] Apr. 29, 1980

[54] CAMERA PROVIDED WITH MEANS FOR GIVING INFORMATION ABOUT PHOTOGRAPHING

[75] Inventors: Yasuhisa Sato, Kawasaki; Sadahiko Tsuji; Kazuo Ishikawa, both of Yokohama; Susumu Matsumura, Kawasaki, all of Japan

[73] Assignee: Canon Kabushiki Kaisha, Tokyo, Japan

[21] Appl. No.: 945,906

[22] Filed: Sep. 26, 1978

[30] Foreign Application Priority Data

Oct. 6, 1977 [JP] Japan ................. 52-120417

[51] Int. Cl.² .................. G02B 5/32; G03B 13/02
[52] U.S. Cl. .................. 354/219; 350/3.85
[58] Field of Search ............... 354/155, 165, 166, 219, 354/220, 224, 225, 77; 350/3.72, 3.85, 3.86

[56] References Cited

U.S. PATENT DOCUMENTS

| | | | |
|---|---|---|---|
| 2,642,790 | 6/1953 | Scholkemeier | 354/165 X |
| 2,744,444 | 5/1956 | Breitman | 354/77 X |
| 3,008,398 | 11/1961 | Sanborn | 354/165 |

FOREIGN PATENT DOCUMENTS

| | | | |
|---|---|---|---|
| 1532389 | 7/1968 | France | 350/3.85 |
| 51-20825 | 2/1976 | Japan | 354/219 |
| 182428 | 2/1935 | Switzerland | 354/165 |
| 1214717 | 12/1970 | United Kingdom | 350/3.85 |

*Primary Examiner*—L. T. Hix
*Assistant Examiner*—Thomas H. Tarcza
*Attorney, Agent, or Firm*—Fitzpatrick, Cella, Harper & Scinto

[57] ABSTRACT

A camera according to this invention includes a diffracting means disposed in the optical path of the object image forming light for a finder. The diffracting means is illuminated by a light source also provided within the body of the camera so as to exit the diffracted light toward the object side. A person who stands on the object side as an object can ascertain whether or not he is within the area of the object field to be photographed by the camera. Also, in taking a picture of himself with a camera mounted on a tripod using a self-timer, he can, while standing on the object side, obtain information about the self-timer through a photographic lens. According to one preferred embodiment of the invention, as the diffracting means, there is used a volume type phase diffracting means to avoid any adverse effect of the diffracting means on the object image forming light in which the diffracting means is placed.

7 Claims, 6 Drawing Figures

CAMERA PROVIDED WITH MEANS FOR GIVING INFORMATION ABOUT PHOTOGRAPHING

BACKGROUND OF THE INVENTION

The present invention relates to a camera capable of emitting an information light from its photographic lens toward the object side to give information about photographing to one standing on the object side.

In taking a picture of a person with a common camera, it is impossible for the person standing on the object side as an object to be photographed to know whether or not he is correctly included within the area of the object field. Also, in taking a picture of himself with a camera mounted on a tripod using a self-timer, it is very difficult for him to ascertain whether the self-timer is correctly operating or not. Therefore, there has been a desire for a camera capable of giving such information about photographing to a person standing on the object side.

In conformity with such desire, some solutions to the problem have been developed recently. According to one of the known solutions, a half mirror is interposed in the optical path for a finder on the camera side. Through an optical path different from the finder optical path, a beam of light is introduced into the half mirror which directs the light beam in the direction opposite to that of the object image forming light. After travelling along the finder optical path in the opposite direction, the information light is emitted from the photographic lens toward the object side.

In another solution, a reticle one surface of which is formed as a light diffusion surface, is disposed in a finder optical path. The diffusion surface is illuminated by illumination light introduced into the reticle so as to produce a diffused light running along the finder optical path in the opposite direction. This diffused light is used as an information light. After being emitted through the photographic lens of the camera toward the object side, the diffused light forms an image of the reticle at a predetermined focal length and in a size approximately equal to the area of the picture field.

However, in those cameras capable of emitting phototaking information toward the object side, it is desirous for a photographer to have a bright view field and further, a bright and accurate information light. A bright view field is important especially for X.L cameras.

While said known solutions enable the camera to emit an information light toward the object side in a simple manner, they have some important disadvantages. For example, in case of the former construction, the half mirror interposed in the object image forming light causes a substantial reduction of the quantity of the image forming light and therefore the view field of the finder becomes dark. In the case of the latter construction, a portion of the diffused light from the light diffusing surface runs toward the eye piece along the finder optical path and has an adverse effect on the object image visible in the finder view field. Moreover, they have a common drawback that the intensity of the information light travelling toward the object side is relatively low as compared to that of illumination light from the light source and therefore it is difficult to obtain a bright and clear information light.

For a camera it is essential to keep the view field bright and easily visible to the operator of the camera. On the other hand, to the object side one, it is desirable that the information light be as bright as possible and the information light should indicate the area of the object field (picture field) as clearly as possible.

SUMMARY OF THE INVENTION

Accordingly, it is one object of the invention to provide a camera which is able to emit information light toward the object side without changing the brightness of the finder view field.

It is another object of the invention to provide a camera capable of emitting a bright and clear information light toward the object side.

It is a further object of the invention to provide a camera capable of emitting information light clearly and exactly indicating the area of the object field.

Other and further objects, features and advantages of the invention will appear more fully from the following description taken in connection with the accompanying drawings.

BRIEF DESCRIPTION OF THE DRAWINGS

FIG. 5 shows arrangements of diffracting means according to the invention wherein

DESCRIPTION OF THE PREFERRED EMBODIMENTS

In accordance with the present invention to attain the above mentioned objects, diffracting means is disposed in an optical path of the object image forming light within the body of the camera. The diffracting means is illuminated by a light source also provided within the body of camera and a diffracted light from the diffracting means is emitted toward the object side.

Figure 1:
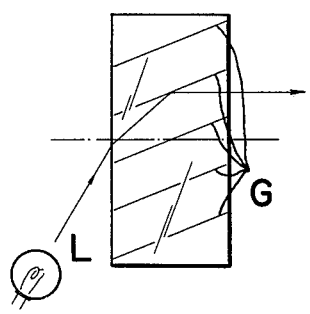
FIG. 1 is an explanatory view of volume type phase hologram.
Figure 2:
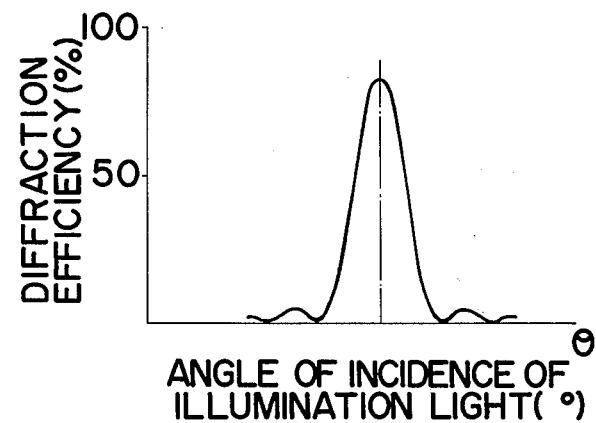
FIG. 2 is a relation curve of diffraction efficiency-incidence angle of illumination light obtained from the volume type phase hologram.

In a preferred embodiment of the present invention, as the diffracting means, there is used a volume type diffracting means. The volume type diffracting means is a diffracting grating G formed by three-dimentionally arranging a number of crest fringe planes as illustrated in FIG. 1. The diffraction grating G may be of intensity distribution or of refractive index distribution. Such volume type diffracting means is featured in that under a suitably determined condition, it can make the diffraction efficiency maximum only for a beam of light L incident upon it in a certain specific direction. In other words, such diffracting means G has a high directivity with respect to its diffraction efficiency. FIG. 2 is a graph showing this characteristic of the diffracting means. The diffraction efficiency versus incidence angle of illumination light correlation curve shown in FIG. 2 was obtained when a volume type diffracting means was illuminated by a beam of monochromatic light while changing the angle of incidence of the illumination light.

An example of a most useful volume type diffracting means is a volume type phase hologram in which the diffraction grating structure is formed in a form of refractive index distribution. The volume type phase hologram has the following very advantageous properties:

(1) It gives a very high diffraction efficiency;
(2) It has a narrow range of angle in which it gives the maximum diffraction efficiency; and
(3) It is possible to make the hologram transparent.

Owing to the above particular properties of the volume type phase hologram, the use of it in the present invention brings various advantages. It has almost no adverse effect on the view field of a finder when the volume type phase hologram is inserted in the object image forming light directed to the finder. Reduction of quantity of light in the view field, such trouble that hologram pattern becomes visible in the finder and other inconveniences otherwise caused by the insertion of a diffracting means can be obviated by using the volume type phase hologram. It allows emission of a reconstructed light efficiently only when the hologram is illuminated by a beam of light coming from a certain definite direction and also it is possible to direct the reconstructed light solely in the opposite direction to the eye piece. Furthermore, it becomes possible to produce multiplex reconstructed light since the direction in which the maximum diffraction efficiency of reconstructed light can be given, varies depending upon the wave length and the direction of light source used to illuminate the hologram. When a source of white light is used, there is produced a reconstructed light dispersed in the form of a rainbow because the direction in which the maximum diffraction efficiency can be given varies from one wave length to another.

Figure 3:
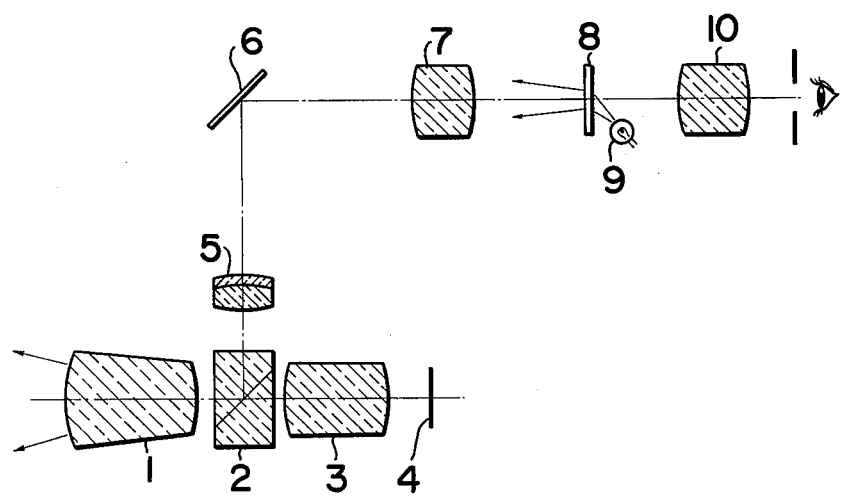
FIG. 3 shows a first embodiment of the invention in which the present invention is applied to a cinecamera.

FIG. 3 shows an illustrative embodiment of the invention in which a volume type phase hologram is inserted in a finder optical system of a movie camera. Designated by 1 is a front group of photographic lenses, 2 is a half prism (or a total reflection spot mirror) and 3 is a rear group of photographic lenses. These elements 1 to 3 constitute a photographic system. An image of an object is formed on a surface of film 4. A beam of light deflected by the half prism 4 (or a total reflection spot mirror) is introduced into the finder optical system.

An objective lens of the finder system is designated by 5, a total reflection mirror by 6 and an erecting lens by 7. Numeral 8 is a volume type phase hologram, 9 is a light source for illuminating the hologram and 10 is an eye piece. When the hologram is illuminated by the illumination light source 9, there is produced a reconstructed light which travels through the finder optical system in the reverse direction and is emitted from the front lens group toward the object (not shown).

If the hologram is manufactured and positioned in such manner that the reconstructed light may be emitted from the photographic lens in every direction within the area of picture to be taken, a person standing in the object field can see the reconstructed light through the photographic lens of the camera. Therefore, by observing the reconstructed light, anyone whose picture is to be taken can be informed as to whether or not he is correctly in the object field or how long a time in seconds before the release of the shutter or other necessary information.

For practical use, it is preferable to focus the reconstructed light image in the vicinity of the object plane and in a size corresponding to the picture size as shown in FIG. 5. This is attainable by determining the size and position of the hologram in such a manner that the reconstructed light image thereof appears on the image surface and the reconstructed image has the same size as that of the image of the object focussed on the image surface. When a focused image type of hologram is used, it is disposed in the image surface and when a Fresnel hologram is used, it is disposed in such position as to allow formation of the reconstructed image thereof on the image surface.

Figure 5A:
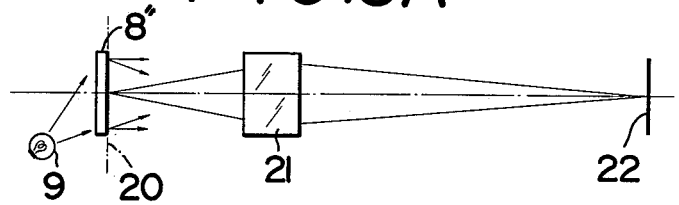
FIG. 5A shows the use of a focused image hologram as the a diffracting means and FIG. 5B the use of a Fresnel hologram.

FIG. 5A shows an arrangement according to the invention wherein a focused image hologram is used. An image focused hologram 8″ of a size corresponding to the picture size is positioned in the image surface 20 so that an image of reconstructed light is imaged on the object plane 22. Numeral 21 designates a finder-photographic optical system.

Figure 5B:
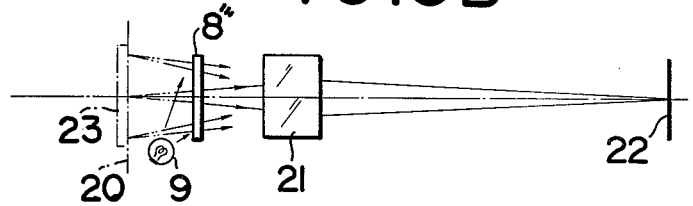

In the arrangement shown in FIG. 5B, a Fresnel hologram is used. By illuminating the hologram 8‴ there is formed a reconstructed image 23 on the image surface and the reconstructed image of a size corresponding to the picture size is imaged on the object plane. Alternatively, such hologram may be disposed outside of the optical path for the finder so that a reconstructed image is formed in the optical path.

As a matter of course, it is not always necessary for the reconstructed light to be imaged on the object plane if no preciseness is required as to the area of the reconstructed image visible from the side of the object. Thus, even when a focused image type hologram is used, it may be disposed in any position. For example, it may be placed in any position between the half prism 2 and the eye piece 10 shown in FIG. 3.

In this manner, a person standing on the object side can observe the reconstructed image of a hologram appearing on the image surface and having a size corresponding to the picture size only when he enters the area of the object field to be photographed. The reconstructed image informs him as to whether or not he is in the area of the object field. Further, he can be informed of information about the self-timer in a simple manner, for example, by controlling the reconstruction time of the reconstructed image visible to him. Also, it may be possible to observe various reconstructed images on the side of the object if some modification is employed in the manufacturing process of a hologram to be used.

Figure 4:
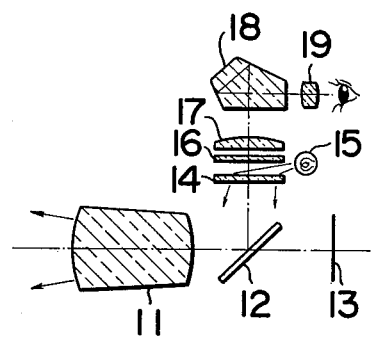
FIG. 4 shows a second embodiment in which the present invention is applied to a single lens reflex camera.

FIG. 4 shows another embodiment of the invention in which the principle of the present invention is applied to a single lens reflex still camera. In FIG. 4, numeral 11 designates a photographic lens, 12 is a movable total reflection mirror and 13 is a film plane; 14 is a hologram which is illuminated by an illumination light source 15 to form a reconstructed light. The reconstructed light is emitted toward the object side through the total reflection mirror 12 and the photographic lens 11. And 16 is an image plate, 17 is a condenser lens, 18 is a Penta-Dach prism and 19 is an eye piece. The hologram may be placed in a position other than the position shown in FIG. 4. The position in which the hologram is placed, can be selected from the spaces existing between the total reflection mirror 12 and the eye piece 19 optionally so long as it does not intercept the effective light for photographing.

While the invention has been particularly shown and described with reference to preferred embodiments thereof, it will be understood by those skilled in the art that the foregoing and other changes in form and details can be made therein without departing from the spirit and scope of the invention.

What we claim is:

1. A camera having a holographic indicator for displaying information relating to a picture taking operation to a person who is the object to be photographed, comprising:
   an objective lens for imaging an object on an image detecting means;
   a shutter and diaphragm means for controlling exposure;
   finder means having an image forming optical means for forming an image of said object on an image forming plane;
   a hologram; and
   an illuminating optical means which illuminates said hologram to obtain a reconstructed image positioned in the optical path of the object image forming light so that light from said holographically reconstructed image travels in the opposite direction to that of said object image forming light and is emitted toward said object through said objective lens such that the person to be photographed is able to observe it;
   whereby the image formed by the finder means is not obstructed by the formation of said reconstructed image.

2. A camera having a holographic indicator according to claim 1, wherein said holographically reconstructed image has optically the same size as that of the image sensing surface of said image detecting means and is positioned in one of the image planes formed by said objective lens and finder means.

3. A camera having a holographic indicator according to claim 1, wherein said hologram is of a volume type.

4. A camera having a holographic indicator according to claim 1, wherein said hologram is of a phase type.

5. A camera having a holographic indicator according to claim 1, wherein said hologram is a focused hologram image.

6. A camera for photographing an object on a recording medium and for displaying information relating to a picture taking operation to a person who is the object to be photographed, comprising:
   an objective lens for imaging an object on said recording medium;
   a shutter and diaphragm means for controlling exposure;
   a view finder means for observing the object to be photographed;
   deflecting means for directing light coming from said objective lens toward said view finder means;
   a phase type diffraction means disposed in the optical path of the object image forming light; and
   an illuminating optical means for illuminating said diffraction means to obtain a diffracted light travelling in the opposite direction to that of said object image forming light and emitted from said objective lens toward the object such that the person to be photographed is able to observe it;
   whereby the image formed by the finder means is not obstructed by the formation of said defracted light.

7. A camera as claimed according to claim 6, wherein said diffraction means has optically the same size as that of said recording medium and is positioned in one of the image planes formed by said objective lens and said view finder means.

* * * * *

UNITED STATES PATENT AND TRADEMARK OFFICE
CERTIFICATE OF CORRECTION

PATENT NO. : 4,200,380
DATED : April 29, 1980
INVENTOR(S) : Yasuhisa Sato et al.

It is certified that error appears in the above—identified patent and that said Letters Patent is hereby corrected as shown below:

Column 6, lines 4 and 5, "focused hologram image" should read -- foused image hologram --.

Signed and Sealed this

Fourteenth Day of October 1980

[SEAL]

Attest:

SIDNEY A. DIAMOND

Attesting Officer

Commissioner of Patents and Trademarks